United States Patent [19]

Kiefer et al.

[11] Patent Number: 5,785,513

[45] Date of Patent: *Jul. 28, 1998

[54] COOKING FUEL CONTAINER AND BURNER

[75] Inventors: Natalie Robin Kiefer, Boonton Township; Francis T. Barbato, Milford, both of N.J.; Larry Hinderer, Texarkana, Tex.; Neale A. Messina, Ewing, N.J.

[73] Assignee: Candle Corporation of America, Greenwich, Conn.

[*] Notice: The term of this patent shall not extend beyond the expiration date of Pat. No. 5,302,114.

[21] Appl. No.: 445,912

[22] Filed: May 22, 1995

Related U.S. Application Data

[63] Continuation of Ser. No. 201,523, Feb. 25, 1994, which is a continuation of Ser. No. 953,422, Sep. 29, 1992, Pat. No. 5,302,114, which is a continuation-in-part of Ser. No. 785,960, Oct. 31, 1991, abandoned.

[51] Int. Cl.$^6$ ..................................................... F23D 3/24
[52] U.S. Cl. .................................... 431/320; 431/298
[58] Field of Search ................................. 431/320, 323, 431/298, 325

[56] References Cited

U.S. PATENT DOCUMENTS

| | | | |
|---|---|---|---|
| 1,327,858 | 1/1920 | Brennan | 431/298 |
| 3,171,398 | 3/1965 | Lawson | 431/197 |
| 3,994,672 | 11/1976 | Novak | 431/324 |
| 4,604,053 | 8/1986 | de la Rosa | 431/320 |
| 4,611,986 | 9/1986 | Menter et al. | 431/320 |
| 4,614,094 | 9/1986 | Kakihana et al. | 66/194 |
| 4,624,633 | 11/1986 | Bandel | 431/320 |
| 4,725,225 | 2/1988 | Gravitt | 431/320 |
| 4,850,858 | 7/1989 | Blankenship et al. | 431/320 |
| 4,896,653 | 1/1990 | Eke et al. | 431/320 |
| 4,911,139 | 3/1990 | Yost | 431/324 |
| 5,302,114 | 4/1994 | Kiefer et al. | 431/320 |

FOREIGN PATENT DOCUMENTS

| | | | |
|---|---|---|---|
| 55-3574 | 1/1980 | Japan | 431/320 |

*Primary Examiner*—Carroll B. Dority

[57] ABSTRACT

A cooking fuel device includes a fuel container and a wick supporting member positioned at the top of the container. The wick supporting member substantially closes the fuel container and contains at least one aperture to communicate with the interior of the container. A wick formed from a piled fabric includes a burn portion and a fuel feed portion. The fuel feed portion extends through the aperture into the fuel in the container. A cover having a central aperture is positioned over the top of the container to define the burn area on the wick. A peelable lid is adhesively attached to the cover and the wick which when removed will raise the pile on the wick.

17 Claims, 3 Drawing Sheets

COOKING FUEL CONTAINER AND BURNER

This application is a continuation of U.S. application Ser. No. 08/201,523 filed Feb. 25, 1994, which is a continuation of U.S. application Ser. No. 07/953,422 filed Sep. 29, 1992 now U.S. Pat. No. 5,302,114, which in turn is a continuation in part of U.S. application Ser. No. 07/785,960 filed Oct. 31, 1991, now abandoned.

FIELD OF THE INVENTION

This invention relates to a cooking fuel container and burner and the use of this cooking fuel container and burner to provide heat to cook, and to maintain a variety of foods at a serving temperature. More particularly, this invention relates to a cooking fuel container and burner that contains a liquid fuel that is capable of providing heat to chafing dishes, buffet servers and ovens for a period of several hours.

BACKGROUND OF THE INVENTION

There is a continuing need in the field of cooking and food warming fuel containers and burners to provide products which will produce an effective temperature level for an extended period of time. Further, these cooking fuel containers and burners should utilize a fuel that is classified as non-flammable. Non-flammable fuels are desirable since this type of fuel provides for a greater level of safety during usage and transportation. It is preferred that the cooking fuel container and burner produce a temperature in an oven, chafing dish or buffet server of at least about 160° F., and preferably at least about 180° C., throughout the majority of its full burn time. The burn time for a cooking fuel container and burner should be at least about three hours, and preferably at least about four hours. A cooking fuel container and burner which will produce a cooking temperature of at least about 180° F. or greater and have a burn time of at least four hours will provide sufficient heat to chafing dishes and buffet servers for a sufficient period of time so that the cooking fuel containers do not have to be changed during a serving session. This is important since the cooking fuel containers when the fuel supply is just depleted are still fairly hot. They must be handled carefully. If the same cooking fuel container and burner can be used throughout an event, the need to change the cooking fuel containers is negated with the problem of having to handle a hot cooking fuel container obviated. A container of this type is more highly useful to the restauranteur.

The present cooking fuel container and burner is of a simplified design, yet produces a cooking temperature in a chafing dish or buffet server of greater than 180° F. with a total burn time of at least about four hours. This cooking fuel container and burner is very efficient in the burning of the container fuel. Further, the cooking fuel container and burner can be shipped and stored without the wick becoming so saturated with the fuel that the container and burner is difficult to ignite. The present wick is unique in that besides providing for the effective delivery of the cooking fuel to the burning surface it also provides an easily lighted burning surface. In addition to overcoming the problems of providing a sufficiently high burn temperature for a sufficiently long period of time, this cooking fuel container and burner also overcomes the problem of the ignition of the essentially flat wick surface. This easy ignition is accomplished without the use of any ignitor materials or ignition pads. The net result is a cooking fuel container and burner which is simple in design, easy to construct, quick and easy to ignite and one which has a sufficiently long burn time and burn temperature to effectively cook and/or heat foods during a normal serving session.

Various cooking fuel containers and burners have been disclosed in the prior art. One such cooking fuel container and burner is described in U.S. Pat. No. 4,604,053. This food warming cartridge, as it is designated, consists of a cylindrical container with a top cover seamed onto the container and closing the top opening of the container. In a central portion of this container and top cover there is a square or rectangular region to expose a flat wick, the two ends of which extend downward into the fuel which is contained in the food warming cartridge. The mode of operation of this food warming cartridge is that the fuel is fed up to the burning surface where it is burned to provide the desired heat. One problem with this design is that it does not provide for insulating the fuel containing region of the cartridge from the heat that is produced from the burning of the fuel. In this cartridge, some of the heat from the burning fuel will be transmitted to the cover with the heat in turn transmitted to the region that contains the fuel. The result is a heating of this region of the cartridge with a pressure produced within the fuel containing region which causes a pumping of the fuel up the wick which results in an uneven burn temperature and an inconsistent burn time from cartridge to cartridge.

U.S. Pat. No. 4,611,986 discloses a disposable liquid fuel burner. This liquid fuel burner is illustrative of a typical center wick burner. In this design, a wick extends downwardly through the top cover of a cylindrical fuel container. This wick extends upwardly through the top cover to a distance above the top cover. In this type of a liquid fuel burner, the burn surface is elevated a distance above the top cover above the burner. This results in less heat being transferred from the wick to the top of the container and thus into the region of the container which contains the liquid fuel. Pumping of the fuel up the wick is thus not a problem. This is an effective burner for liquid fuels, however, since it is comprised of a single central wick, it tends to produce a small diameter flame and thus a localized heating. It is preferred that the fuel burn surface be of as large an area as possible in order to provide for a more even heating of buffet trays and chafing dishes. Also, typically fuel burners of this type do not have a substantially constant burn temperature throughout the full burn time.

U.S. Pat. No. 4,850,858 discloses a liquid fuel burner which does provide for an enlarged burn surface area. However, this liquid fuel burner is quite complex in its structure. This liquid fuel burner consists of a cylindrical container which has a top closure. Within this top closure is an opening to provide for an enlarged burning surface. Within the container portion there is a wick which passes upwardly from the fuel region up into a wick region. This wick is of a single strand which passes upwardly through the center of a wick supporting table and overlays this wick supporting table. Overlaying this wick is a non-combustible fiber bat. Overlaying this non-combustible fiber bat is a bat of plastic foam. This bat of plastic foam serves as an ignitor for the fiber bat. In operation, the wick conveys the liquid fuel up to the fiber bat. The fiber bat becomes saturated with the liquid fuel as does the polymeric foam bat that overlays the fiber bat. In usage, the plastic foam bat is ignited. This plastic foam bat burns away and in most instances will effectively light the fiber bat. The fiber bat then provides the burning surface for the liquid fuel. This is a fairly complex structure for a liquid fuel burner.

U.S. Pat. No. 4,896,653 discloses a further type of a cooking fuel can and burner. This is of a center wick structure and is directed to the usefulness of a central recessed area and the use of peripheral air vents. A drawback of this type of a cooking fuel product is the lack of a constant heat profile from just after ignition until just before the depletion of the fuel. This type of cooking fuel container will produce a lower heat level upon ignition followed by an increasing level of heat production during the burning of the fuel and tapering to a lower burn temperature at the end of the burning period. In addition, this type of a center wick structure does not provide for the advantages of a burn surface which has an enlarged burn surface region.

U.S. Pat. No. 4,991,139 discloses a liquid fuel container which has a wick which extends upwardly upon the removal of a lid. This structure provides for an easier igniting of the wick and will result in less heat transfer the cooking fuel container. However, this liquid fuel container suffers from the same problems as other center wick burners. That is, it provides for a localized heating of the buffet server or chafing dish. Further, this type of a cooking fuel containers does not provide for the essentially constant flame temperature throughout the burning of the contained fuel.

The present cooking fuel container and burner overcomes the various problems and deficiencies of the prior art devices. It is less complicated in design and structure. It provides a wick surface that is easily ignited. There is also provided a temperature in a chafing dish or buffet server of about 180° F. The burn time will be a period of time of greater than about three hours, and preferably greater than about four hours. These are all significant and important advantages.

SUMMARY OF THE INVENTION

The present cooking fuel container and burner is one which is comprised of only five primary parts. Upon being assembled, they produce a cooking fuel container and burner which provides a container which can be shipped without any leakage of liquid fuel, can be easily ignited without the need for any special ignitors, and will produce a substantially constant burn temperature for a period of time sufficient to serve a meal. This cooking fuel container and burner is comprised of a fuel container which has an open top. This open top container is substantially closed by a wick support means coupled to the upper edge of the container. This wick supporting means has at least one and preferably two apertures adjacent its periphery which communicate with the interior of the fuel container. A fiber wick is supported on this wick supporting means and substantially fills this wick supporting means. In one embodiment, the wick includes two leg portions which extend downwardly through the apertures in the wick supporting means and into the liquid fuel that is contained within the lower portion of the container. A cover is positioned over the wick which has a central opening sufficient to define an enlarged burning region when the wick is ignited. This opening in the cover is sealed by means of a lid, which is preferably adhesively bonded to the cover and the burn region of the wick.

The wick is substantially the dimensions of the wick supporting means which in turn substantially closes the top opening of the container. In addition, the wick is of a terry cloth, pile or tufted woven fiber structure to provide a burning surface having an increased surface area to provide a better fuel air mixing. The increased burning surface is created by the pile, terry loops or tufts of the fabric which project upwardly from the weft of the fabric. Preferably, the wick is a single ply thickness.

An additional feature, and one which contributes to the burn time and the temperature profile produced in a chafing dish or buffet server is the cross-sectional area of the wick leg segments for feeding fuel to the body of the wick which extend downwardly through the apertures in the wick supporting means and into the fuel. The cross-sectional area of the wick leg segments and the cross-sectional shape and dimension of the apertures is such that the cross-sectional area of the wick leg segment preferably substantially fills the cross-sectional area of the apertures in the wick supporting means. The size of the apertures also controls the rate of fuel flow to the wick and thus the burn time and heat output.

A further feature, and one which also contributes to the burn time and to the temperature profile produced, is the distance of the wick supporting means to the cover in the area of the cover opening. This distance has an effect on the flow of fuel to the burn surface of the cooking fuel container and burner.

The net result of the relationship of the cross-sectional area of the wick segments, the size and shape of the apertures in the wick supporting means and the distance of the wick supporting means to the cover provide for a controlled flow of fuel upwardly from the container and to the burn surface. In addition, the wick material has a loosely tufted, terry-loop structure which provides for an enhanced fuel air mixing. The raised terry pile and tufts provide for an ease of ignition and for a more controlled and uniform burning during the use of the cooking fuel container and burner.

These and other advantages of the invention will become apparent from the following detailed description, which, taken in conjunction with the annexed drawings, discloses preferred embodiments of the invention.

DETAILED DESCRIPTION OF THE INVENTION

As has been discussed, the present invention is directed to a cooking fuel container and burner which has improved burning characteristics as well as ease of ignition. This cooking fuel container and burner is of a simplified construction. This cooking fuel container and burner will produce a heating profile with a rapid heating of a chafing dish or buffet server to above about 180° F. from about an ambient temperature with essentially a constant production of heat at this temperature until the exhaustion of the fuel in the container. The burn time of this cooking fuel container and burner will be at least about three hours, and preferably at least about four hours.

Figure 1:
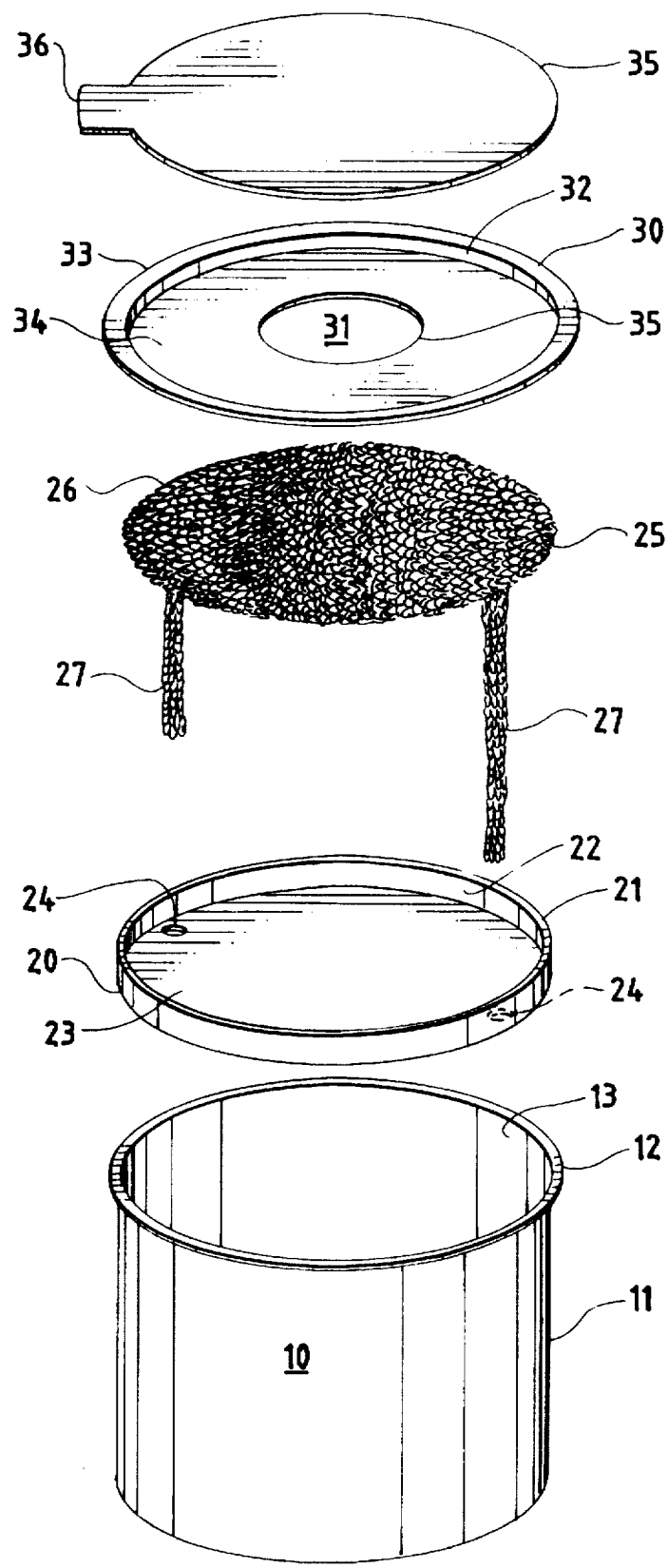
FIG. 1 sets forth an exploded view in perspective of the cooking fuel container and burner of the present invention.

The cooking fuel container and burner is more particularly described in FIG. 1. The container 10 is a cylindrical container having a side wall 11, an upper rim 12 and an open top 13. Into this container is fitted a wick supporting member 20. The wick supporting member 20 has a tray-like shape comprising a base portion 23 for supporting a wick 25, an upstanding side wall 22 and an upper rim 21. The side wall 22 is dimensioned to fit snugly against the inside of wall 11 of the fuel container 10. The base portion 23 includes one or more annular shaped apertures 24 through which wick feed segments can pass and communicate with the fuel which will be contained within the container 10. A wick 25 includes the feed segments 27 which are passed downwardly through the apertures 24 in the base portion 23 so that the main burn portion 26 of wick 25 is supported by the base portion 23 of the wick supporting member 20.

Figure 2:
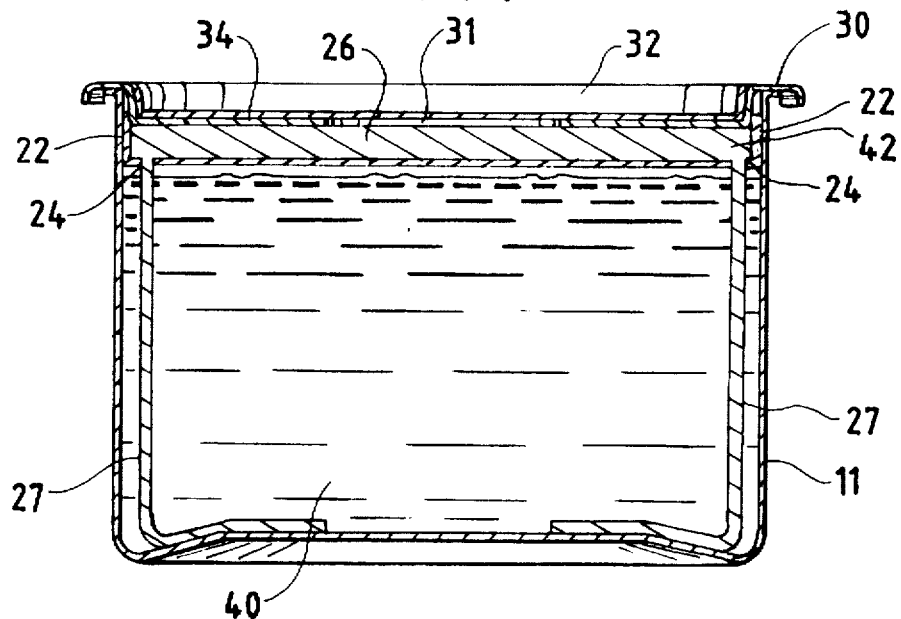
FIG. 2 sets forth a cross-sectional elevational view or the assembled cooking fuel container and burner of the present invention and as shown in FIG. 1.

A cover 30 overlies the wick 25 and consists of a flat portion 34 which has an aperture 31 and which covers a greater part of the surface area of the wick 25. The aperture 31 defines the burn portion 26 of the wick 25 when the cover is assembled onto the support 20 and the container 10. Extending upwardly from the flat portion 34 is a cover side wall 32 which terminates at an outwardly extending shoulder 33. The side wall 32 of the cover 30 is generally dimensioned to fit snugly with the side wall 21 of the wick support member 20 as shown in FIG. 2.

The aperture 31 in the cover 30 is sealed by means of a lid 35 adhesively attached to the cover and the exposed wick. The lid preferably will have a pull tab 36 to assist in removing the lid from the cover 30. In preferred embodiments, the lid 35 is a flexible foil lid adhesively attached to the base portion 34 of the cover and to the burn portion 26 of the wick 25 within the aperture 31.

In assembling the different parts of the cooking container as shown in FIG. 1, the wick supporting member 20 is press fitted into the upper portion of the container 10 such that the upper edge 21 of the member 20 is substantially adjacent the rim 12 of the container 10. This wick supporting member 20 will remain adjacent to the opening 13. Prior to or after being press fitted into the container 10, the wick 26 will be assembled onto the wick supporting member 20. This is accomplished by threading the wick feed segments 27 downwardly through the apertures 24. After the wick supporting member 20 is in place, the cover 30 is then crimp sealed onto the container 10 by crimping the shoulder 33 of the cover 30 over the rim 12 of container 10. A sealant is preferably provided between the cover and rim 12 of the container 10. After the cover 30 has been placed and sealed onto the container 10, the lid 35 is adhesively sealed over the aperture 31. In alternative embodiments, the wick supporting member 20 is first attached to the cover 30 and then the assembly is placed on the fuel container 10.

The dimensions of various parts of this cooking fuel container and burner are important with regard to the igniting and burning characteristics of this container and burner. It is important that the area of the apertures 24 in the wick supporting member be within a particular range. These annular apertures should be of a size where the wick that extends through the aperture fills the aperture. In this way, the wick will serve also to seal the fuel storage part of the container from the burn surface of the wick. In a circular embodiment, these apertures are of a diameter having an area of from about 8 to 40 square millimeters, and preferably about 20 mm². Further there is a relationship between the cross-sectional area of the apertures 24 and the cross-sectional dimension of the wick segments 27 which pass through apertures 24. It also has been found that the wick segments which substantially fill the cross-sectional area of the apertures 24 provide effective fuel flow to the wick without unduly restricting fuel flow. In length, the wick segments will contact and preferably rest on the bottom surface of container 10 as illustrated in FIG. 2.

In preferred embodiments of the invention, two apertures 24 are provided along opposite edges of the base portion 23.

The apertures 24 are positioned adjacent the side walls 22 so that the apertures are not positioned directly below the opening 31 in the cover 30. In the embodiment illustrated in FIG. 1, the apertures are annular shaped and dimensioned to accommodate the feed segments 27 of the wick 26. The size of the apertures 27 are generally about 50–125% of the cross-sectional dimension of the feed segments 27 when dry. When the wick is placed in the fuel, the feed segments 27 swell slightly to completely fill the aperture. In alternative preferred embodiments, the aperture is dimensioned about 75–100% of the dry cross-sectional dimension and most preferably about 90–100% of the dry cross-sectional dimension of the feed segments 27. The actual size of the apertures will depend in part on the wick material, the type of fuel and the desired burning rate and flame height. The amount of fuel being fed to the burning surface 25 of the wick can be varied by adjusting the size and shape of the apertures and the size of the feed segments 27. Reducing the size of the apertures in relation to the size of the feed segments of the wick restricts the flow of fuel to the burn surface of the wick thereby increasing burn time of the fuel container. It is generally preferred to have the size and shape of the feed segment of the wick complement the dimension of the aperture to substantially fill the aperture. In this manner, the fuel is able to easily wick up to the burn area of the wick without restriction. The wick segments further fill the apertures sufficiently to prevent leakage of the fuel through the aperture.

Figure 4:
FIG. 4 shows an alternative embodiment of a rectangular aperture in the wick supporting member.
Figure 6:
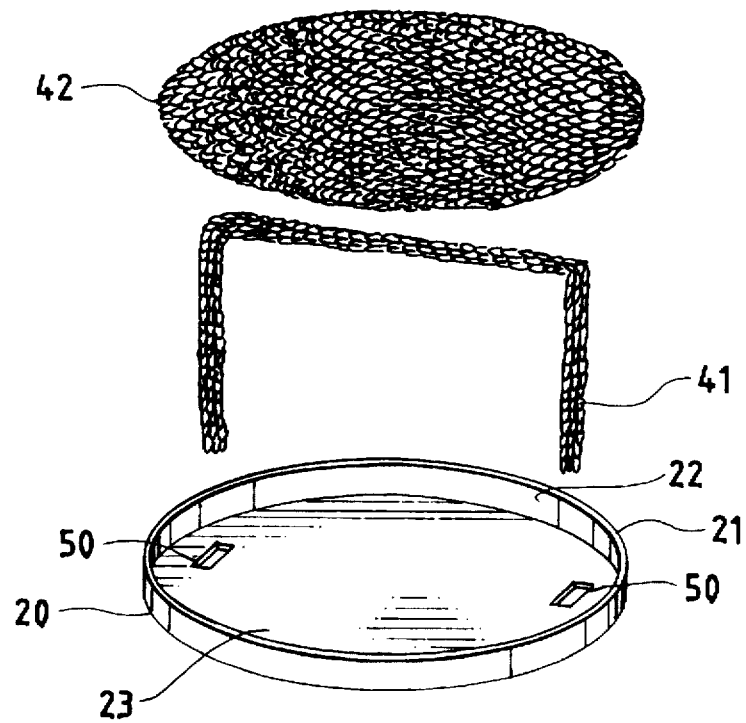
FIG. 6 shows a further embodiment of the two piece wick assembly and wick supporting member.

In a further embodiment, the aperture in the wick support member may be a substantially rectangular shape 52 having slightly rounded edges as illustrated in FIG. 4 and FIG. 6. The length of the rectangular aperture can range from about 3.0–10 mm and preferably about 5.0–7.0 mm and most preferably about 6.0 mm. The width of the aperture can range from about 2.0–5.0 mm and preferably about 2.0–4.0 mm and most preferably about 3.0 mm.

In certain embodiments it is desirable to have the apertures in the wick supporting member with a substantially straight edge facing toward the center of the wick supporting member. The feed segments of the wick extend from the wick and must bend sharply down through the aperture into the fuel container. Bending the feed segment of the wick over the straight edge of the aperture reduces crimping of the wick and prevents restriction of fuel flow.

Figure 5:
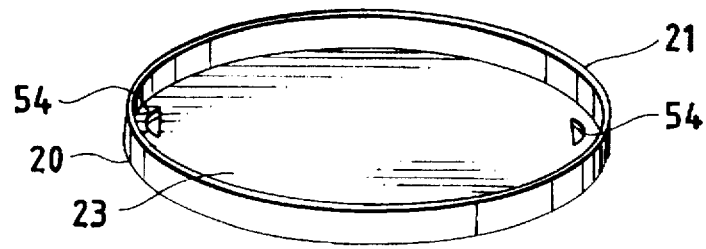
FIG. 5 shows a further embodiment of a semi-circular aperture in the wick supporting member.

In further embodiments, the aperture is a half-moon, semi-circular shape 54 as shown in FIG. 5. The straight side of the aperture is preferably facing the outer edge of the wick supporting member. The semi-circular aperture generally has a radius of about 2.0–6.0 mm and preferably about 4.0 mm. Generally, the area of the semi-circle will be about 4 to 20 square mm and preferably about 10 square mm.

In the embodiment illustrated in FIGS. 1 and 2, the wick includes two feed segments extending from opposite edges of the wick. It has been found that two feed segments provide an adequate feed rate of fuel to the burn portion of the wick. In alternative embodiments where a higher feed rate is desired, additional feed segments may be used in combination with additional apertures in the wick support member. In addition, the height of the rim 21 above the base 23 of the wick supporting member is also a significant feature. That is, the depth of the sidewall 22 should be of a controlled dimension since the edge 35 of aperture 31 of the flat portion 34 of the lid should be a set distance from the wick supporting surface 23. This is also termed the squeeze dimension of the wick. The height of edge 35 above surface 23 should be from about 4.5 mm to about 1.25 cm and preferably about 8–9 mm.

Another feature that is important with regard to the operational characteristics of this cooking fuel container and burner is the surface of the wick. The wick may be a woven or non-woven material having a pile of suitable height and density to provide an elevated burning surface and to effectively wick the fuel to the burning surface. A closed loop, terry-type pile fabric material is generally preferred since the pile provides a large surface area exposed to the air to support combustion of the fuel. The pile further provides an efficient means to wick the fuel from the body of the wick to the combustion surface which is the surface formed by the ends of the pile. A pile burn surface on the wick provides a large fuel surface area for ease of ignition without the need for ignition compositions. It also provides a surface for good air/fuel mixing and thus a more efficient combustion of the fuel. The fuel wicks up the pile or loops with the result being an enhanced burning due to better air/fuel mixing.

The pile of the wick generally extends away from the weft and warp yarns of the fabric which results in the burning front being slightly elevated from the wick and the ends of the pile which contributes to the air mixing efficiently with the fuel. The fuel wicks up each pile to essentially define a plurality of burn fronts or burn areas. The spacing of each pile allows a greater fuel-air mixture than that which is obtainable from a standard non-pile wick material. It has been found that with fuels having a high flash point such as ethylene glycol that a pile or tufted wick produces a better fuel-air mixture resulting in a higher burn temperature compared to conventional non-pile wick materials. The pile is believed to result in a leaner fuel/air mixture.

In preferred embodiments, the wick is a terry-type cloth fabric comprising a plurality of ground warp yarns, ground fill yarns, and pile warp yarns to define terry pile loops as known in the art. Generally, the terry loops extend from both faces of the fabric to maximize the wicking capacity of the fabric. A suitable terry-type fabric has a weight of about 30 to 90 meters per kilogram. The fabric generally has about 10:1 filling yarn, about a 10:1 ground yarn, about 3.55:1 pile yarn, a terry ratio of about 7, 28 ends per centimeter and about 17 picks per centimeter.

The wick is preferably a terry-type cloth although in alternative embodiments the fabric is a closed loop pile or a cut pile fabric. The terry loops, closed loops or cut pile have a length sufficient to form a surface area and wicking capability to support combustion of the fuel. The length of the terry loops, closed loops or pile is sufficient to produce efficient fuel/air mixing to elevate the burn front a slight distance above the wick and the pile. The length of the pile or loops is generally at least about 1 mm up to about 10 mm, preferably about 2–7 mm and most preferably about 3–5 mm. The wick material will preferably have a thickness of about 4–15 mm and preferably about 5–10 mm. The density of the pile or loops will also effect the thickness of the wick material. It will be recognized that the pile may tend to lay flat on the wick material and thus the length of the pile may not accurately reflect the thickness of the wick material. Generally, it is preferred to have a wick material which extends away from the material to promote air/fuel mixing.

The feed segments 27 of the wick may be integrally formed with the wick 25 or may be separate members attached to the wick such as by stitching. The feed segments are preferably formed of the same wick material as the wick. In alternative embodiments, the feed segments may be a conventional woven wick material. The dimension of the feed segments are preferably substantially the dimensions of the apertures in wick support member and typically have a width ranging from about 4–12 mm.

In preferred embodiments, the wick material is 100% cotton terry-type cloth. Synthetic blends may also be used provided the synthetic materials do not dissolve in the fuel or burn out before the end of the useful life of the cooking container.

The lid 35 preferably has an adhesive over its entire inner surface to adhesively secure the lid to the cover 30 and wick burn area 26. In this way when the lid 35 is placed onto the cover 30, the adhesive of the lid in the area 31 of the cover will contact the pile or tufts in the burn area 26 of the wick 25. When the lid 35 is removed from the cover 30, the adhesive will cause the pile of the wick to be pulled upwardly away from the body of the wick and thus position the pile for a maximum air fuel mixing region during ignition. Raising the pile will increase the surface area of the wick to provide a wick surface that is particularly easy to ignite. During shipping and packaging, the pile tends to compact and lay flat against the body of the wick. The adhesive on the lid enables the pile to be raised from the body of the wick while the wick is saturated with fuel. Raising the pile of the wick prior to lighting is particularly advantageous when fuels are used which have a high flash point such as ethylene glycol which can sometimes be difficult to light.

FIG. 2 shows the cooking fuel container and burner in an elevational view in an assembled state. In this view, the wick segments 27 are shown extending through the apertures 24 down into the fuel 40. The wick supporting member 20 is shown press fitted into container 10. Cover 30 is shown substantially covering the wick 25 with the burn surface of the wick only exposed through the aperture 31. The cover 30 is shown here as crimp sealed down onto the top edge surface of container 10.

In an alternate configuration for the wick, segments along the sides of the wick can be removed to form a truncated circular section. In this embodiment it is not necessary that the wick 25 fully cover the base 23 of the wick supporting member provided the wick is dimensioned to fill the aperture 31 to define an effective burn area 26 on the wick.

Figure 3A:
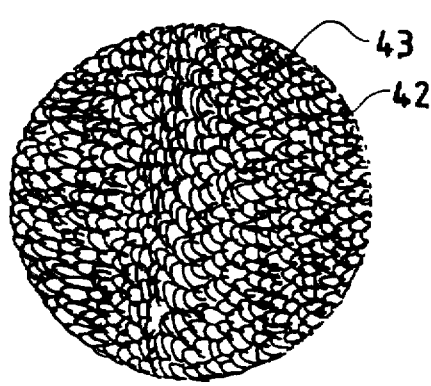
FIGS. 3A and 3B show an alternative embodiment for the wick for the cooking fuel container and burner.
Figure 3B:
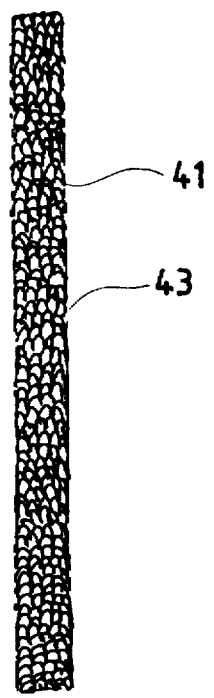

FIGS. 3A and 3B and FIG. 6 show a further alternative embodiment of the wick. In this configuration the wick is in the form of an assembly including separate wick feed segments 41 and a wick body 42. The wick feed segment 41 is formed from a single piece of wick material. The wick body 42 is formed from a separate piece of wick material and overlays and substantially covers the wick support surface 23 of the member 20. The wick feed segment 41 preferably is one continuous strip extending through both apertures in the wick support member. As illustrated in FIG. 6, the ends of the wick feed segments are fed through the rectangular apertures 50 in the support member 20 which conform substantially to the cross-section of the wick feed segment 41. A circular piece of wick material 42 is then placed over the wick feed segment 41. Fuel from the container is thus fed up the feed segments to the burn portion of the circular wick 42. In alternative embodiments, this circular portion can have truncated sides.

The circular wick material 42 is preferably a terry-type pile or tufted fabric as in the embodiment of FIGS. 1 and 2. The wick feed segment 41 is preferably also a terry-type file or tufted material. In further embodiments, the feed segments 41 is formed from a woven or braided wick material that does not have any substantial pile. The composition of the feed segments is not critical provided it is able to wick an effective amount of the fuel to the wick body 42. The wick body 42 will be contiguous with the feed segments to absorb the fuel such that combustion occurs on or above the burn area of the wick.

Although the wick 25 need not fully cover the base surface of wick support member 20, it is a preferred feature that it substantially cover the surface 23, since the wick 25 or 42 will provide an insulating effect between the flame that extends upwardly through aperture 31 from the fuel that is in container 10. Heat that would be produced by the flame would in part be transmitted to the surface 34 of cover 30. Then, in order for this heat to be transmitted to the fuel in the container, the heat must travel through the wick 25. The heat of vaporization of the fuel in wick 25 will serve to aid in insulating the fuel within container 10 from any heat that could be transmitted from the cooking flame.

The net result of this cooking fuel container and burner is a unit which produces a constant temperature flame throughout a burn time of greater than about four hours for a standard size container. A standard size container is one which will contain from about 250 grams to 325 grams and preferably about 285 grams of cooking fuel. The cooking fuel is preferably an organic liquid which is classified as non-flammable for purposes of safety classification and handling. The cooking container of the invention is particularly suitable for non-flammable fuels such as the glycols, and in particular, ethylene glycol and propylene glycol. These flues have a high flash point, high vaporization temperature and are stable at high temperatures.

Various modifications can be made to the present cooking fuel container and burner to produce essentially the same results. Such cooking fuel containers and burners would function in essentially the same manner and would be equivalent in structure. All such cooking fuel containers and burners would be considered to be within the presently claimed invention.

What is claimed is:

1. A cooking fuel wick for use in a cooling fuel container and burner comprising a pile fabric having a pile fabric burning surface portion and a fuel feed portion to deliver fuel to the burning surface portion, said pile fabric having a cut or loop pile that wicks fuel to the upper ends of said pile, said pile extending upwardly a distance of about 1 mm to 10 mm, said fuel feed portion comprising at least one feed segment adapted to extend into said fuel container whereby during a burning fuel is delivered to said pile fabric to produce heat during a period of fuel ignition.

2. A cooking fuel wick as in claim 1 wherein said burning surface portion and said fuel feed portion are separate portions with the burning surface portion overlying the fuel feed portion.

3. A cooking fuel wick as in claim 1 wherein said burning surface portion and the fuel feed portion are an integral part of the same structure with the feed portion depending from a peripheral edge of said burning surface portion.

4. A cooking fuel wick as in claim 2 wherein there are at least two fuel feed portions.

5. A cooking fuel wick as in claim 3 wherein there are at least two fuel feed portions.

6. A cooking fuel wick as in claim 2 wherein said burning surface portion has a generally circular shape.

7. A cooking fuel wick as in claim 3 wherein said burning surface portion has a generally circular shape.

8. A cooking fuel wick as in claim 2 wherein said burning surface portion is planar and is maintained planar during usage.

9. A cooking fuel wick as in claim 3 wherein said burning surface portion is planar and is maintained planar during usage.

10. A cooking fuel wick as in claim 1 wherein said pile fabric is comprised of terry loops.

11. A cooking fuel wick as in claim 1 wherein said pile fabric is comprised of closed loops.

12. A cooking fuel wick as in claim 1 wherein said pile fabric is comprised of a terry pile.

13. A cooking fuel wick as in claim 1 wherein said pile extends upwardly about 2 mm to 7 mm.

14. A cooking fuel wick as in claim 13 wherein said pile material has a thickness of about 4 to 15 mm.

15. A cooking fuel container as in claim 14 wherein said pile fabric is a terry fabric.

16. A cooking fuel container as in claim 1 wherein said terry fabric is comprised of warp yarns, ground fill yarns and pile yarns.

17. A cooking fuel wick as in claim 4 wherein the feed segments have cross-sectional area of about 6 sq. mm to about 50 sq. mm.

* * * * *

UNITED STATES PATENT AND TRADEMARK OFFICE
CERTIFICATE OF CORRECTION

PATENT NO. : 5,785,513
DATED : July 28, 1998
INVENTOR(S) : Kiefer, et. al.

It is certified that error appears in the above-identified patent and that said Letters Patent is hereby corrected as shown below:

Column 9, line 37, replace "cooling" with "cooking".

Signed and Sealed this

Ninth Day of February, 1999

Attest:

Attesting Officer

*Acting Commissioner of Patents and Trademarks*